US010319517B2

(12) United States Patent
Long et al.

(10) Patent No.: US 10,319,517 B2
(45) Date of Patent: Jun. 11, 2019

(54) METHOD OF AND APPARATUS FOR GENERATING AN ADJUSTABLE REACTANCE

(71) Applicant: MOMENTUM DYNAMICS CORPORATION, Malvern, PA (US)

(72) Inventors: Bruce Richard Long, Arlington, VA (US); Andrew William Daga, Malvern, PA (US); Daniel S. Hackman, Reading, PA (US)

(73) Assignee: Momentum Dynamics Corporation, Malvern, PA (US)

(*) Notice: Subject to any disclaimer, the term of this patent is extended or adjusted under 35 U.S.C. 154(b) by 143 days.

(21) Appl. No.: 15/665,688

(22) Filed: Aug. 1, 2017

(65) Prior Publication Data

US 2018/0053598 A1 Feb. 22, 2018

Related U.S. Application Data

(62) Division of application No. 13/891,917, filed on May 10, 2013, now Pat. No. 9,754,717.

(Continued)

(51) Int. Cl.
*H01F 27/42* (2006.01)
*H01F 37/00* (2006.01)
(Continued)

(52) U.S. Cl.
CPC .............. *H01F 38/14* (2013.01); *H02J 5/005* (2013.01); *H02J 7/025* (2013.01); *H02J 50/10* (2016.02); *H02J 50/12* (2016.02)

(58) Field of Classification Search
CPC .. H02J 50/10; H02J 50/12; H02J 7/025; H02J 5/005; H01F 38/14
See application file for complete search history.

(56) References Cited

U.S. PATENT DOCUMENTS 3,539,826 A 11/1970 Crouse
4,002,058 A 1/1977 Wolfinger
(Continued)

FOREIGN PATENT DOCUMENTS

CN 87216457 U 8/1988
CN 201061162 Y 5/2008
(Continued)

OTHER PUBLICATIONS

"Chinese Application Serial No. 201610662526.5, Office Action dated Jul. 3, 2018", W/English Translation, 10 pgs.
(Continued)

*Primary Examiner* — Rexford N Barnie
*Assistant Examiner* — Rasem Mourad
(74) *Attorney, Agent, or Firm* — Schwegman Lundberg & Woessner, P.A.

(57) ABSTRACT

A method for adjusting reactance includes an adjustable reactance generator including a comparator receiving an input sinusoidal waveform and outputting a square wave that retains the frequency and phase of the applied sinusoidal waveform. The reactance adjustment is generated using a power switching circuit that receives the square wave from the comparator as a control signal and outputs a square wave that retains the frequency and phase of the applied sinusoidal voltage waveform, an adjustable power supply that adjusts the amplitude of the square wave output by the power switching circuit, and an amplitude detector that controls the output level of the adjustable power supply. The power switching circuit output, when converted to a sinusoid, provides the effect of an adjustable reactance.

13 Claims, 5 Drawing Sheets

Related U.S. Application Data

(60) Provisional application No. 61/645,850, filed on May 11, 2012.

(51) Int. Cl.

| | | |
|---|---|---|
| *H01F 38/00* | (2006.01) | |
| *H01F 38/14* | (2006.01) | |
| *H02J 50/10* | (2016.01) | |
| *H02J 7/02* | (2016.01) | |
| *H02J 5/00* | (2016.01) | |
| *H02J 50/12* | (2016.01) | |

(56) References Cited

U.S. PATENT DOCUMENTS

| | | | |
|---|---|---|---|
| 4,039,981 | A | 8/1977 | Ohashi et al. |
| 4,498,044 | A | 2/1985 | Horn |
| 5,041,763 | A | 8/1991 | Sullivan et al. |
| 5,258,766 | A | 11/1993 | Murdoch |
| 5,726,537 | A | 3/1998 | Huber et al. |
| 9,754,717 | B2 | 9/2017 | Long et al. |
| 2002/0123779 | A1* | 9/2002 | Zarinetchi ............ A61N 1/3787 607/60 |
| 2009/0009243 | A1* | 1/2009 | McCune, Jr. ......... H03F 1/0205 330/1 R |
| 2009/0243397 | A1 | 10/2009 | Cook et al. |
| 2010/0184371 | A1 | 7/2010 | Cook et al. |
| 2010/0194369 | A1 | 8/2010 | Nagai et al. |
| 2011/0025132 | A1* | 2/2011 | Sato ........................ H02J 5/005 307/104 |
| 2011/0285316 | A1 | 11/2011 | Yinn et al. |
| 2012/0170341 | A1* | 7/2012 | Fornage .............. H02M 7/5387 363/132 |
| 2013/0106385 | A1 | 5/2013 | Smith, Jr. et al. |

FOREIGN PATENT DOCUMENTS

| | | |
|---|---|---|
| CN | 101388610 A | 3/2009 |
| CN | 102017362 A | 4/2011 |
| EP | 0609964 A2 | 8/1994 |
| JP | 09149565 A | 6/1997 |
| JP | 0878252 A | 3/2016 |
| KR | 101914820 B1 | 10/2018 |
| WO | WO-2011036659 A2 | 3/2011 |

OTHER PUBLICATIONS

"Chinese Application Serial No. 201610662526.5, Response filed Aug. 27, 2018 to Office Action dated Jul. 3, 2018", W/O English Translation.
"Korean Application Serial No. 10-2014-7034846, Notice of Preliminary Rejection dated May 21, 2018", W/ English Translation, 6 pgs.
"U.S. Appl. No. 13/891,917, Advisory Action dated May 5, 2017", 3 pgs.
"U.S. Appl. No. 13/891,917, Final Office Action dated Dec. 21, 2016", 12 pgs.
"U.S. Appl. No. 13/891,917, Non Final Office Action dated Apr. 20, 2016", 13 pgs.
"U.S. Appl. No. 13/891,917, Notice of Allowance dated Jun. 15, 2017", 8 pgs.
"U.S. Appl. No. 13/891,917, Notice of Allowance dated Jul. 26, 2017", 2 pgs.
"U.S. Appl. No. 13/891,917, Response filed Feb. 22, 2016 to Restriction Requirement dated Dec. 21, 2015", 8 pgs.
"U.S. Appl. No. 13/891,917, Response filed Apr. 20, 2017 to Final Office Action dated Dec. 21, 2016", 14 pgs.
"U.S. Appl. No. 13/891,917, Response filed Oct. 20, 2016 to Non Final Office Action dated Apr. 20, 2016", 14 pgs.
"U.S. Appl. No. 13/891,917, Restriction Requirement dated Dec. 21, 2015", 5 pgs.
"Chinese Application Serial No. 201380032535.0, Office Action dated Apr. 5, 2016", W/ English Translation, 17 pgs.
"Chinese Application Serial No. 201380032535.0, Office Action dated Nov. 21, 2016", W/ English Translation, 13 pgs.
"Chinese Application Serial No. 201380032535.0, Response filed Feb. 6, 2017 to Office Action dated Nov. 21, 2016", 10 pgs.
"Chinese Application Serial No. 201380032535.0, Response filed Aug. 12, 2016 to Office Action dated Apr. 5, 2016", 30 pgs.
"European Application Serial No. 13787746.0, Extended European Search Report dated May 2, 2016", 17 pgs.
"European Application Serial No. 13787746.0, Intention to grant dated May 15, 2017", 32 pgs.
"European Application Serial No. 13787746.0, Partial European Search Report dated Dec. 17, 2015", 7 pgs.
"European Application Serial No. 13787746.0, Response filed Nov. 30, 2016 to Extended European Search Report dated May 2, 2016", 11 pgs.
"European Application Serial No. 17204148.5, Extended European Search Report dated Jan. 15, 2018", 9 pgs.
"International Application Serial No. PCT/US2013/040581, International Preliminary Report on Patentability dated Nov. 20, 2014", 8 pgs.
"International Application Serial No. PCT/US2013/040581, International Search Report dated Nov. 1, 2013", 4 pgs.
"International Application Serial No. PCT/US2013/040581, Invitation to Pay Additional Fees dated Sep. 5, 2013", 2 pgs.
"International Application Serial No. PCT/US2013/040581, Written Opinion dated Nov. 1, 2013", 6 pgs.
"Japanese Application Serial No. 2015-511763, Office Action dated Jun. 20, 2017", With English Translation, 13 pgs.
"Japanese Application Serial No. 2015-511763, Response filed Sep. 17, 2017 to Office Action dated Jun. 20, 2017", w/English Claims, 30 pgs.
"Mexican Application Serial No. MX/a/2014/013715, Office Action dated May 11, 2016", (English Translation), 5 pgs.
"Mexican Application Serial No. MX/a/2014/013715, Office Action dated Sep. 19, 2016", (English Translation), 8 pgs.
"Mexican Application Serial No. MX/a/2014/013715, Response filed Feb. 2, 2017 to Office Action dated Sep. 19, 2016", 11 pgs.
"Mexican Application Serial No. MX/a/2014/013715, Response filed Sep. 8, 2016 to Office Action dated May 11, 2016", 9 pgs.
"Mexican Application Serial No. MX/a/2016/011638, Office Action dated Jun. 13, 2017", 2 pgs.
Bina, Tavakoli Mohammad, et al., "The bootstrap variable inductance: a new FACTS control element", Power Electronics Specialists Conference, PESC 99, 30th Annual IEEE vol. 2; 619-625, (1999), 7 pgs.
"Canadian Application Serial No. 2,873,195, Examiner's Rule 30(2) Requisition dated Feb. 18, 2019", 4 pgs.
"European Application Serial No. 17204148.5, Response filed Oct. 17, 2018 to Extended European Search Report dated Jan. 15, 2018", 15 pgs.

\* cited by examiner

METHOD OF AND APPARATUS FOR GENERATING AN ADJUSTABLE REACTANCE

CROSS-REFERENCE TO RELATED APPLICATIONS

This application is a Divisional of U.S. patent application Ser. No. 13/891,917 filed May 10, 2013, which claims benefit to U.S. Provisional Patent Application No. 61/645,850, filed May 11, 2012. The contents of that application are hereby incorporated by reference.

TECHNICAL FIELD

This patent application pertains to the transmission of electrical energy by means of resonant induction. More specifically, it describes a method of and apparatus for generating the adjustable reactance needed for efficient resonant inductive power transmission.

BACKGROUND

Inductive power transmission has many important applications spanning many industries and markets. FIG. 1 shows a conceptual representation of a resonant inductive power transmission system. In FIG. 1, a source of alternating electrical energy is applied to the primary inductor 100 of an air gap transformer. Magnetic coupling between the transformer primary inductor 100 and the transformer secondary inductor 102 transfers some proportion of the primary side energy to the transformer secondary inductor 102, which is removed by some distance from the primary inductor 100. The primary inductor magnetic field, the primary inductor current, and the secondary inductor current are proportional. Resonance applied to the primary inductor 100 increases primary side inductor current producing a corresponding increase in the magnetic flux, the secondary inductor current and the power transferred from the primary to the secondary.

The magnetic flux from the primary inductor 100 induces a voltage into the winding of secondary inductor 102. Maximum secondary current and therefore maximum power transmission occurs when the secondary inductor winding is resonant as well. The result is a two-pole resonant circuit consisting of two magnetically coupled resonant circuits. The resonant circuits can be parallel resonant with the inductor and capacitor wired in parallel as shown in FIG. 1, or they can be series wired and series resonant. Furthermore, the primary and secondary side resonances need not share the same form.

Efficient resonant inductive wireless power transfer relies upon maintaining a high degree of resonance in both the primary source inductor and a secondary load inductor. However, transformer primary and secondary resonant frequencies are affected by many factors including manufacturing variation, component tolerance, primary-secondary separation distance, axial alignment, temperature and other factors. Efficient resonant inductive wireless power transfer therefore demands continuous, autonomous adjustment in order to maintain the required high degree of resonance.

When providing an inductive (or wireless) source of power to vehicles, for example, these variations are encountered routinely and present a critical problem for manufacturers of electric vehicles and other vehicles that require an external source of power. It is desired to develop a system for charging vehicles that addresses these problems such that the primary inductor winding may be located on or in a horizontal surface and the secondary inductor winding may be attached to the bottom of the vehicle for efficient wireless transfer of electrical power to the vehicle. The present invention addresses these needs in the art.

SUMMARY

An adjustable reactance generator and associated method that meets the afore-mentioned needs in the art includes a comparator receiving an input sinusoidal waveform and outputting a square wave that retains the frequency and phase of the applied sinusoidal waveform. The reactance adjustment is generated using a power switching circuit that receives the square wave from the comparator as a control signal and outputs a higher power square wave that retains the frequency and phase of the applied sinusoidal voltage waveform, an adjustable power supply that adjusts the amplitude of the square wave output by the power switching circuit, and an amplitude detector that controls the output level of the adjustable power supply. The power switching circuit's output, when converted to a sinusoid, provides the effect of an adjustable reactance.

In exemplary embodiments, the power switching circuit includes a half-bridge circuit having two power switching devices, a full-bridge configuration, a flyback configuration, a resonant tank with single ended or push-pull drive configuration, a single or double ended forward converter configuration, or other power switching or power conversation circuit topologies of these general configurations. The adjustable power supply also includes a controlled voltage source, a controlled current source, or a switch mode power supply. In the exemplary embodiments, the amplitude adjusted output of the amplitude detector is converted to a sinusoidal signal by a Thevenin impedance and an LC resonant air core transfer transformer.

Practical embodiments of the adjustable reactance generator in accordance with the invention include a resonant air gap transfer transformer having a primary side resonant LC circuit and a secondary side resonant LC circuit, a power generating section that provides a first high power square wave through a first DC blocking capacitor and a first Thevinin inductor to summing nodes of the primary side resonant LC circuit, a reactance generating section that provides a second high power square wave through a second DC blocking capacitor and a second Thevinin inductor to the summing node of the primary side resonant LC circuit, and a rectifier-filter load circuit connected to the secondary side resonant LC circuit. Preferably, the phase and amplitude differences between the first high power square wave and the second high power square wave produce a current into the summing node of the primary side resonant LC circuit that provides an effective impedance that is adjusted by adjusting the phase and/or the magnitude of the first and second high power square waves.

In exemplary embodiments, the reactance generating section includes a voltage comparator that samples a voltage waveform at the summing node of the primary side resonant LC circuit and outputs a square wave on-off representation of the voltage at the summing node of the primary side resonant LC circuit, an inverter connected to an output of the voltage comparator, and a half bridge pair of power semiconductor switches respectively connected to an output of the voltage comparator and an output of the inverter. As noted above, the power switching circuit may also include a full-bridge configuration, a flyback configuration, a resonant tank with single ended or push-pull drive configuration, a single or double ended forward converter configuration, or other power switching or power conversation circuit topologies of these general configurations. The power semiconductor switches may be field effect transistors, bipolar transistors, insulated gate bipolar transistors, vacuum tubes, and/or photo-conductive switches.

In the exemplary embodiments, the magnitude of the second high power square wave is set by a controllable power supply that provides power to the second half bridge pair of power semiconductor switches. The controllable power supply may be a controlled voltage source having an output voltage that is proportional to the amplitude of the voltage waveform at the summing node of the primary side resonant LC circuit, a controlled current source having an output current that is proportional to the amplitude of the voltage waveform at the summing node of the primary side resonant LC circuit, a controlled voltage source having an output voltage that is proportional to the amplitude of the current waveform at the summing node of the primary side resonant LC circuit, or a controlled current source having an output current that is proportional to the amplitude of the current waveform at the summing node of the primary side resonant LC circuit. In each embodiment of the controllable power supply, the proportionality of the output of the power supply to the amplitude of the waveform at the summing node of the primary side resonant LC circuit is preferably $1/(1-G)$, where G is gain of the reactance generating section. Alternatively, the power supply may provide fixed output power to the second half bridge pair of power semiconductor switches but the circuit further includes a pulse width modulator that modulates the output of the second half bridge pair of power semiconductor switches to adjust gain of the reactance generating section.

These and other embodiments of the invention will be apparent to those skilled in the art from the following detailed description.

DETAILED DESCRIPTION OF ILLUSTRATIVE EMBODIMENTS

Figure 1:
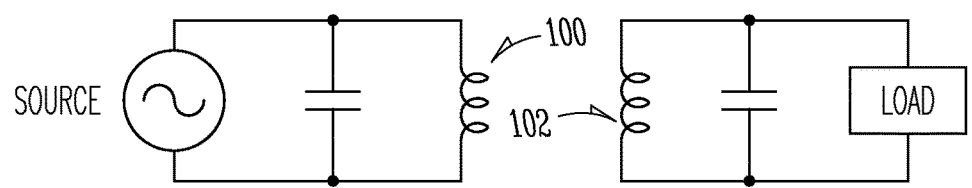
FIG. 1 shows a conceptual representation of a prior art resonant inductive power transmission system.

An exemplary embodiment of the invention will be described for use in charging electrically powered vehicles, although those skilled in the art will appreciate that the teachings provided herein may be used to power other electrically powered systems. In the exemplary embodiment, the primary winding may be located on or in a horizontal surface and the secondary coil may be attached to the bottom of the vehicle. Those skilled in the art will appreciate that such applications, in practice, encounter problems including those described below.

Vertical movement of the secondary and/or primary windings (z-axis translation) due to, for example, people moving inside a vehicle, passenger ingress or egress, loads being applied to or removed from a vehicle, vibrations in the pavement due to the movement of large vehicles, the effect of wind gusts on the vehicle, snow and ice build-up on a vehicle, buildup of snow and ice on the road surface, degradation of the vehicle suspension over time, and other instances which cause the vehicle to move changes the separation distance between the primary and secondary windings.

Translational displacement or movement in either or both the x-axis (e.g., front-to-back) and the y-axis (e.g., side-to-side) dimensions leads to a non-concentric alignment of the secondary and the primary windings. This may include translational misalignment due to, for example, improper or imprecise positioning of the secondary winding above the primary winding as well as vehicle motion.

Planar misalignment between the primary and secondary windings may be seen when the secondary is mounted to the underside of a vehicle and the vehicle itself is not situated perfectly planar parallel to the surface of the pavement on or in which the primary is emplaced. Under such circumstances, the primary and secondary windings will be misadjusted for resonance and a correction must be made based on the encountered conditions peculiar to a single instance of the placement of a vehicle. When the vehicle moves and is again situated with respect to the same primary, or another primary is located in a new location, the planar alignment will almost certainly be imperfect. In each case, according to an embodiment of the invention, the resonance of the system may be adjusted accordingly.

Similarly, when situated, the primary and secondary may fall out of precise alignment due to external forces acting on the vehicle. These forces may act in combination to change the position of the secondary with respect to the primary in the x, y, and/or z axes, and it can be seen that the result may be some form of misalignment due to translational displacement. This may be seen in a skew or planar misalignment, and/or a vertical or translational motion or displacement.

The above-described displacements may be seen as discrete long-duration displacements, or as short duration movements, or as oscillatory motion. Mechanical displacement or motion disrupts resonant inductive power transfer resulting in reduced power transfer efficiency and engenders the possibility of system malfunction, shutdown or even system damage. For this reason automatic resonant adjustment or compensation may be a part of an exemplary embodiment of the invention.

Further, because many vehicles have complex suspension systems, and because inductive power components may be installed on the sprung chassis of a vehicle, unpredictable, complex, and highly variable vibratory motion can be expected. For this reason, the an embodiment of the invention may be responsive to the widest possible range of vehicle motions that would disturb a tuned resonant inductive transformer and to be able to make required adjustments quickly to effectively eliminate the deleterious effects of vibration and movement.

The primary and secondary inductors along with their associated resonating components form a complex and interacting second order resonant network. Alteration, deviation or variation of any network component or parameter may result in less than optimum performance. Electrical components can be fabricated with a high degree of repeatability but the required high degree of manufacturing precision incurs undesirable development and manufacturing costs. The ability to absorb or otherwise compensate for manufacturing variability is therefore desirable in an exemplary embodiment of the invention.

Further, because wide market adoption of inductive power systems for vehicles (and for non-vehicular applications)

will be predicated on interoperability between the primary and secondary inductors produced by different manufacturers, an embodiment of the invention may accommodate system variations arising between systems designed, manufactured, and installed by multiple companies and agencies. In such an embodiment, any primary side inductor and associated components designed and manufactured by any one company may be required to function automatically and/or flawlessly with any secondary side inductor and associated secondary side components manufactured by any other manufacturer. Such "mismatched" inductive power systems, even if unified under an international standard, will face significant interoperability challenges. It is only through active and automatic re-tuning that these units can be caused to work efficiently.

Fixed, factory-preset tuning may be unlikely to achieve and unlikely to maintain the tuning precision required for efficient operation in the face of the manufacturing and alignment variations discussed above. Furthermore, the normal operational abuse endured by vehicles, the violent motions, shocks, impacts, and other external stresses encountered during operation means even an initially adequate fixed-tuned system will need frequent maintenance, repair and realignment over the service life of the vehicle. For this reason, and especially given the compounding problem of interoperability standards, an exemplary embodiment of the invention includes resonance confirmation and likely resonance readjustment prior to each recharging event as well as continuous resonance monitoring and re-adjustment if necessary during the recharging operation. Incremental improvements over years of manufacture may result in variability in coil design that cannot be predicted. Automatic re-tuning offers a means to assure that legacy inductors continue to operate with newly designed and recently manufactured inductors.

In yet another embodiment of the invention it is possible for inductors of differing geometry to interoperate. This may be needed when a primary coil is larger or has a different morphology than the secondary coil. For example, an oval primary coil will need to operate with secondary coils of various size and shape. Again, automatic resonance adjustment may be necessary to establish and maintain resonance.

Ambient temperature variations may also affect resonant tuning and require adjustment in an embodiment of the invention. Expected ambient operating temperatures vary widely due to geographic location, season, time of day, weather, wind, solar exposure, or shadow including the shadow of the charging vehicle. The secondary coil and associated electronics is further subject to vehicle thermal emissions, which might well dominate other thermal effects. Furthermore, large ambient temperature changes during charging cannot be discounted and vehicle side temperatures cannot be assumed to be the same as or to follow temperature of the ground mounted primary side coil. Coil resonance may vary with temperature due to thermal expansion and contraction of the coil itself, the temperature sensitivity of associated electronics components especially the resonating capacitors, changes in the magnetic permittivity of the associated ferrite material and also due to changes in coil separation distance induced by the temperature sensitivity of the vehicle tires and suspension components.

In yet another embodiment the invention provides a means of electronic tuning that makes the primary-secondary system of inductors readily adaptable to the dynamic charging of moving vehicles. In the case of moving vehicles, the secondary inductor is fixed to the vehicle. A moving vehicle is caused to pass over a linear array of multiple independent primary inductors, with each primary inductor sequenced by an automatic sequencer to power on and then off in such a fashion as to couple power to the secondary vehicle inductor for a short interval of time as the vehicle passes overhead. Clearly, in such a case, the optimal x, y, z and parallel plane alignment conditions are achieved only momentarily for each primary-secondary coil combination. At all other times, dynamic resonance tuning must be practiced in an autonomic manner to maintain system resonance and wireless power transfer efficiency as the secondary coil repeatedly approaches, achieves and then departs from alignment. With overlapping or closely spaced ground fixed coils, multiple coils might be energized simultaneously with continuously varying real and reactive power-time trajectory thereby creating the effect of a dynamically moving virtual primary coil that maintains system resonance and wireless power transfer efficiency with a moving vehicle in the presence of all the misalignment conditions and resonance disturbing influences stated above.

Furthermore, the present invention enables the practice of highly efficient bi-directional operation of power transmission where power can flow in either direction between the vehicle and an off-board device. In many envisioned applications of electrically power vehicles, it may be desirable to use the energy stored within the vehicle batteries, capacitors or other energy storage devices to operate off-board equipment or to supplement the power distribution grid. While the arrangement and design of the primary and secondary inductors are reversed and the system must still maintain resonance in the presence of off-board load that may well present unknown and varying requirements for both real and reactive power.

One or more of the above factors requiring active and automatic resonance control in vehicle mounted wireless power systems may be present in non-vehicular wireless power transfer applications and might well be accompanied by further, application and situation specific disturbing factors needing automated detection and correction.

Additionally, in compensating for the one or more of the above factors, an exemplary embodiment of the invention may meet one or more of the following performance criteria:

The means by which automatic re-tuning occurs must be in near-real-time and be continuous during the power transmission period.

The technology used to accomplish re-tuning cannot be excessively massive or volumetrically large.

The technology used to accomplish re-tuning should not demand a large power supply to operate or substantially depreciate the power transmission efficiency of the system.

The technology used to accomplish re-tuning should not cause or produce secondary effects which degrade the other aspects of the inductive wireless power transfer performance.

The technology used to accomplish this re-tuning should be tightly integrated into the electronic system of components to reduce overall system complexity, reduce cost, and improve the capacity of maintenance personnel to effectuate cures to malfunctioning inductive power systems.

The technology used to accomplish re-tuning should represent only a small fraction of the cost of fabricating an inductive power system.

According to an embodiment of the invention, the load side (secondary) inductor circuit resonance is allowed to vary according to one or more of the factors mentioned above. The load inductor resonance error polarity and magnitude may be determined by comparing the phase of the load inductor resonant circuit voltage waveform and the phase of the load resonant circuit current waveform. A wireless communications link from the secondary side to the primary side may indicate the magnitude and polarity of the secondary side resonance error and the primary side microcontroller may then adjust the frequency of the primary inductor excitation until secondary resonance is achieved, as indicated by secondary side voltage and current waveforms being in phase.

In this way, the system operating frequency is adjusted such that the fixed tuned secondary resonator is always operated at its resonant frequency. Then, primary side resonance may then be established at the newly adjusted operating frequency by adjustment or other manipulation of the primary side inductor and associated resonating and impedance matching components. What remains then is the adjustment of the primary side inductor and associated resonating components such that they are also resonant at the secondary side resonant operating frequency. Such resonance adjustment may be done by mechanically or electrically switching various reactances (such as, for example, capacitance) into or out of the circuit until resonance is achieved. An exemplary embodiment relies upon N switches and N capacitors, the later selected according to a binary 1-2-4-8 sequence which allows $2^N$ evenly spaced reactance values from N switched reactances. Alternatively, multiple inductors can be switched into or out of the circuit as required or inductor taps can be switch selected as required.

Resonant wireless power transfer requires a high degree of precision that may not be possible with a switched reactance approach using a practical number of switches and reactive components. The adjustment granularity achieved with a practical number of switches may be too large.

Another exemplary embodiment may use an electrically variable reactance such as a varactor diode (voltage variable capacitor), or a current variable inductance in which a variable dc bias current usually placed in a secondary control coil alters the permeability of a ferromagnetic core thereby altering the inductance.

However, the varactor diode may be unable to handle power levels in excess of a few milliwatts and cannot easily provide large capacitance values. Likewise, the current variable inductor is large, heavy, and also may be unable to handle large power levels because the dc bias current functions by moving the operational point of the magnetic core material towards saturation thereby reducing the inductor current and power rating.

However, according to an embodiment of the invention, an alternative resonance adjustment approach making use of the Miller Effect overcomes the adjustment granularity and power level limitations of the embodiments discussed above. Consider FIG. 2A which shows a Miller reactance generator 200 comprising a conventional ideal voltage amplifier 202 with gain G and a feedback impedance Z 204. Input voltage and current to this network is indicated by $E_T$ and $I_T$, respectively.

The voltage across the impedance Z is set by the amplifier voltage gain G which in turn affects the input terminal current $I_T$. The effective impedance across the amplifier input terminals is then given by:

$$Z_{\text{eff}} = \frac{Z}{1-G} \quad \text{Equation 1}$$

This is a highly desirable arrangement as the effective impedance can be easily and effectively altered by changing G. Moreover, G can be positive or negative, which allows negative (for G>+1) or positive (for G<+1) effective impedance values to be generated. It is noted that negative impedances are potentially unstable. Nevertheless, useful reactance adjustments may be possible using negative impedances operating with sufficient stability margins. For G=1 the voltage across Z is zero and the effective impedance is infinity, effectively an open circuit. As amplifier gain G is a vector $Z_{\text{eff}}$ can also be altered by changing the amplifier phase shift.

Figure 2A:
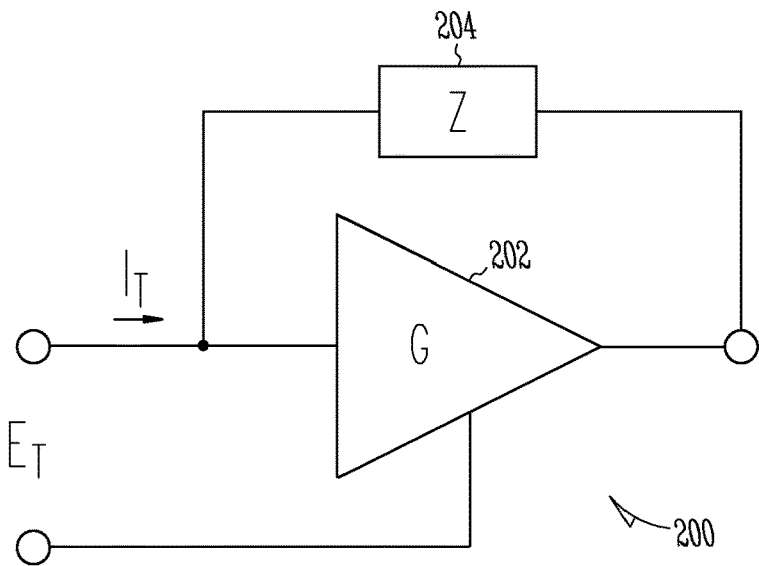
FIG. 2A shows a conventional Miller impedance generator and FIG. 2B shows an exemplary electronic reactance generator, according to an embodiment of the invention.

A disadvantage in the Miller Impedance Multiplier in FIG. 2A is the power requirement of the linear voltage amplifier 202. As a rough order of magnitude estimate, the percentage of total drive power provided by the voltage amplifier 202 is about the same as the desired adjustment range; a ten percent adjustment range means the voltage amplifier 202 provides about 10% of the total power. This may be a problem as the efficiency of an analog linear amplifier can be 20% or less. Consequently, semiconductor devices in the voltage amplifier 202 must be substantially oversized adding to the cost of such an implementation. Associated power supply and heat sink or heat management systems further inflate the cost of implementation.

Power conversion efficiency disadvantage of a conventional, linear, analog amplifier can be avoided through the use of digitally controlled switching techniques. Specifically, the analog amplification function can be replaced by a circuit embodiment employing pulse width modulation ("PWM") and an associated analog to PWM conversion block. Such amplifiers are capable of very good efficiency; however, the PWM power switching devices may switch at frequencies much higher than the frequency of the signal to be amplified in order to satisfy the Nyquist criteria. Furthermore, precise amplitude or gain adjustment in a conventional PWM amplifier requires precise, fine grained adjustment of pulse width which places additional demands on the bandwidth of the PWM power switching devices. Thus, the power conversion efficiency of a conventional PWM amplifier implementation may require a fast PWM power switching devices, a requirement that carries cost and other practical liabilities.

A method of circumventing the excessive bandwidth requirements imposed by conventional PWM amplifiers used as part of an electronically adjustable reactance generator can be developed from the principles that (1) the voltage and current waves in a resonant circuit of sufficiently high quality factor Q are sinusoidal and (2) that any sinusoid can be completely and absolutely described by three parameters: frequency, phase and amplitude.

Conventional PWM signal generation can generate any arbitrary waveform limited only by the need to satisfy the Nyquist criteria for the highest frequency component. However, such waveform flexibility is wasted when used in electronically variable reactance generator. Indeed, according to an exemplary embodiment, a functional reactance generator can be implemented that employs only squarewave generation at the system frequency of operation, thus faster switching devices may not be required.

Figure 2B:
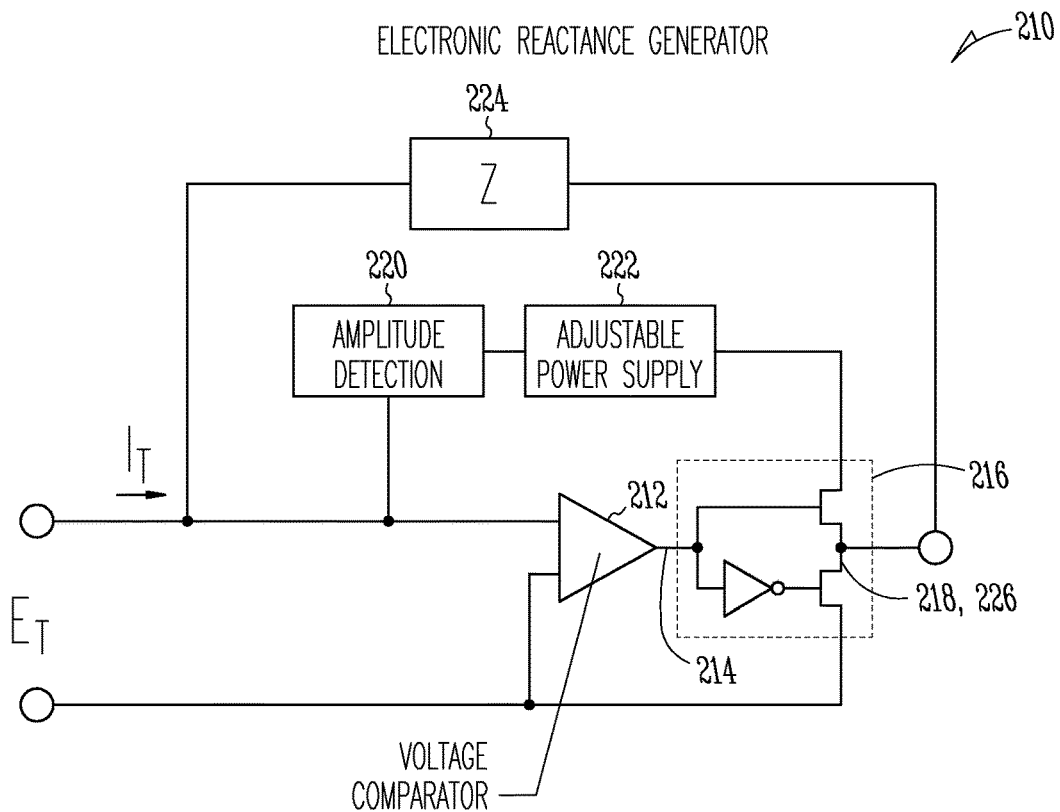

FIG. 2B shows an exemplary electronic reactance generator 210, according to an embodiment of the invention. In FIG. 2B, a voltage comparator 212 samples the applied sinusoidal voltage waveform $E_T$ creating a square wave at point 214 that retains the frequency and the phase of the applied sinusoidal voltage waveform $E_T$. As the square wave at point 214 has constant amplitude, the amplitude information of the applied sinusoidal voltage waveform $E_T$ may not be retained. The resulting square wave, output at point 214, controls the switching frequency and phase of a power switching circuit 216. An exemplary power switching circuit 216 is depicted in FIG. 2B as a half-bridge circuit comprising two power field effect transistors 218, 226. Other power switching circuits 216 may be used as well. For example, the power switching circuit may comprises a full-bridge configuration, a flyback configuration, a resonant tank with single ended or push-pull drive configuration, a single or double ended forward converter configuration, or other power switching or power conversation circuit topologies of these general configurations. The output of the power switching circuit 216 may be a square wave with amplitude determined by the adjustable power supply 222.

The adjustable power supply 222 may be a controlled voltage source thereby creating a half-bridge output voltage square-wave with controlled amplitude, or the adjustable power supply 222 may be implemented as a controlled current source thereby leading to a current square-wave at the half-bridge output. In either case, the square-wave retains the frequency and phase of the applied sinusoidal voltage $E_T$. The missing $E_T$ amplitude parameter may be introduced by means of the Amplitude Detection block 220 which controls the amplitude of the adjustable power supply 222. The method of control can be analog, digital, or some combination thereof.

In an exemplary embodiment, the adjustable power supply 222 may be implemented as a conventional switch mode power supply having output amplitude controlled by any of the switch mode power supply control methods well known in conventional art. Further, in an exemplary embodiment, the amplitude detection block 220—controlled power supply 222 transfer function Out/In may be made equal to G in the original analog Miller reactance generator diagram of FIG. 2A.

In an exemplary embodiment, the circuit shown in FIG. 2B replicates the frequency, phase and G scaled amplitude of the applied sinusoid voltage $E_T$ with a square wave at the output of the half-bridge. The square wave is generated, in part, by adjustable power supply 222, which is controlled, for example, by an exemplary switch mode power supply control method that avoids the power conversion inefficiencies of conventional analog amplifiers. Conversion of the square wave to a sinusoid is accomplished by the combined filtering action of the Thevenin impedance Z 224 and the LC resonant air core transfer transformer (not shown). The Thevenin impedance Z 224 may be implemented as a pure reactance since a resistive component of the Thevenin impedance, if present, may introduce losses. The optimal reactance (inductive or capacitive), for any given application, depends largely upon the half-bridge power supply source type. An inductive reactance may be preferred in conjunction with a voltage source fed power switch, while a capacitive reactance may be preferred when a current source power supply is used. The embodiment described above represents a general design methodology that may be implemented in multiple configurations. Accordingly, several alternative implementations of the electronic reactance generator are described below.

Figure 3:
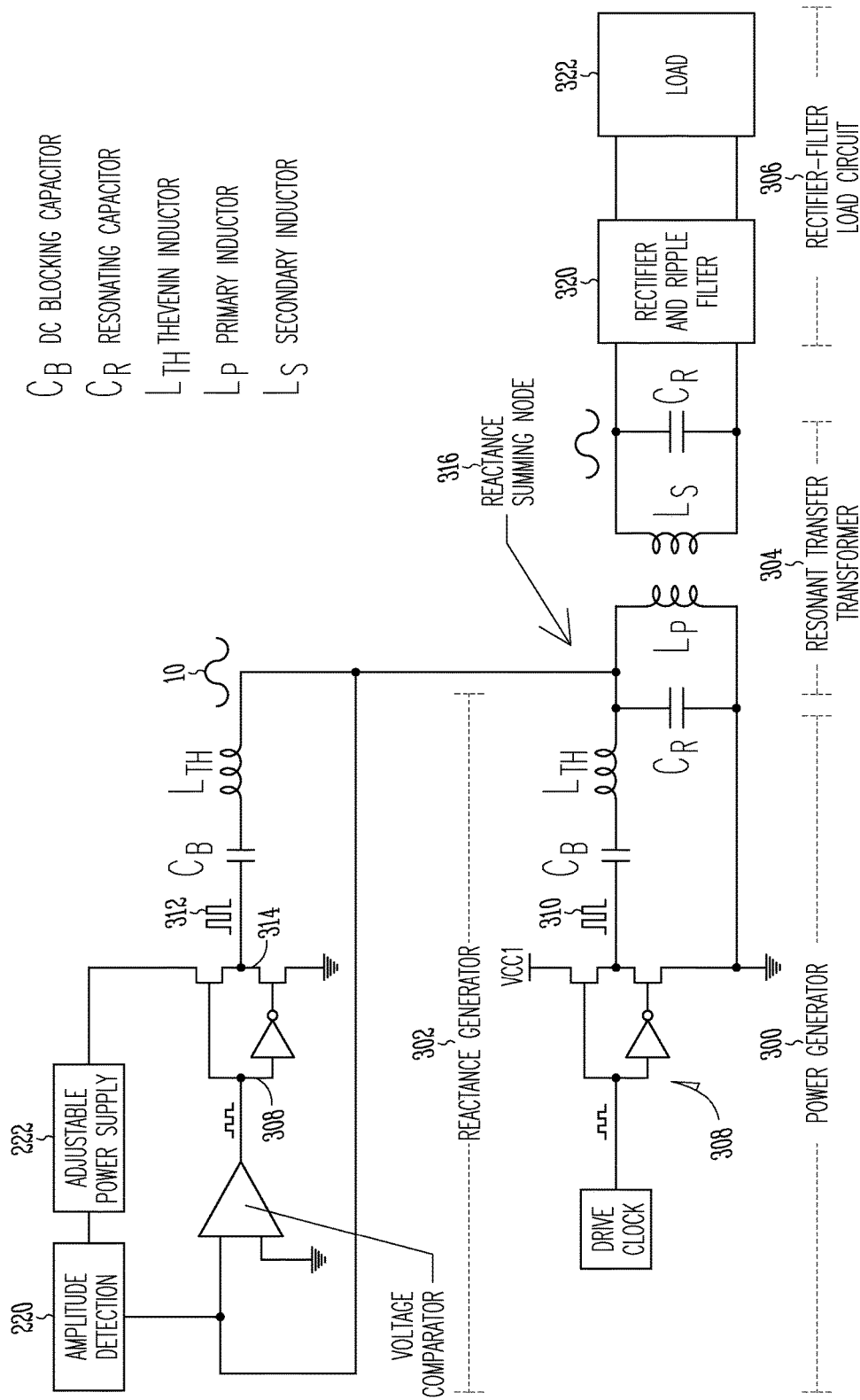
FIG. 3 shows an exemplary embodiment of the adjustable reactance generator.

FIG. 3 illustrates exemplary embodiments of an electronic reactance generator using the principles described above. This circuit includes a power generating section 300 and a reactance generating section 302 of the primary inductor side and a resonant air gap transfer transformer 304 and a rectifier-filter-load circuit 306 of the secondary inductor side.

The power generator section 300 may contain a power switching circuit 308 that converts the dc power supply voltage $V_{cc1}$ into a high power square-wave 310 that is applied through a DC blocking capacitor $C_b$ and Thevenin inductor $L_{th}$ to the primary side resonant LC circuit including resonating capacitor $C_r$ and primary inductor $L_p$. At system resonance, the power generator 300 may see a purely resistive load, and as a result, the power generator 300 provides only real power. Square-wave harmonics may see a high impedance load established by the Thevenin inductor. For this reason square wave harmonic currents may be minimized.

The exemplary reactance generator 302 may have the same topology as the real power generator 300. The reactance generator 302 may also develop a square wave 312 at its half-bridge output node 314. However, this square-wave 312 may or may not have the same phase or the same amplitude as the power generator square-wave 310. The phase and amplitude differences can be arranged to produce a current through the reactance generator's Thevenin inductor $L_{th}$ into the reactance summing node 316 that replicates the effect of a shunt, passive, and/or reactive component. The effective impedance of this virtual component may be easily altered by adjustment of the reactance generator's half-bridge drive phase and/or the half-bridge dc power supply magnitude.

As illustrated in FIG. 3, the voltage amplifier functionality of the Miller reactance generator shown in FIG. 3 may be implemented with a voltage comparator 318, an inverter and a half-bridge pair of power semiconductor switches. In FIG. 3 these semiconductor devices are shown as Field Effect Transistors (FETs) but other power switching devices such as but not limited to bipolar transistors, Insulated Gate Bipolar Transistors (IGBTs), or even vacuum tubes, or photo-conductive switches (e.g., laser activated photo-conductive switches) can be used. In this embodiment, the analog power amplifier is replaced with a simpler, less expensive, more efficient switching implementation.

Continuing with the exemplary embodiment depicted in FIG. 3, the voltage comparator 318 samples the voltage waveform at the reactance-summing node 316 and creates a square wave on-off representation of the summing node voltage. The amplitude information of the summing node sinusoidal waveform is obviously lost in this operation. It may be added back later. The square wave represents only the phase of the sinusoidal waveform that appears across the resonant circuit to be adjusted.

The square wave and an inverted version of the square wave control two FET devices wired in a half-bridge or totem pole configuration and operated as switches instead of linear devices. Working together, the two FETs may generate a high power square wave 312 at their common node, the amplitude of which may be set by the magnitude of the half-bridge controllable power supply labeled $V_{cc2}$, which may be in turn applied to blocking capacitor $C_b$ and then Thevenin inductor $L_{th}$. In an exemplary embodiment, changing the magnitude of $V_{cc2}$ changes the apparent gain of this unconventional Miller amplifier thereby changing the magnitude of the reactance generated by the Miller reactance generator. $V_{cc2}$ is supplied by a digital or analog control of a switch-mode power supply (not shown). The control signal may be derived by a microcontroller (not shown) using a digital representation of the reactance summing node voltage. The microcontroller may adjust the magnitude of $V_{cc2}$ in proportion to the amplitude of the sine wave present at the reactance-summing node. The constant of proportionality may be $1/(1-G)$ as before to produce the desired reactance. The Miller impedance in this embodiment, which employs a half-bridge transistor pair fed by a controlled voltage source, is an inductor, which acts in part as a low pass filter thereby avoiding large current switching transients associated with the higher Fourier square wave components of the drive circuit. For this reason, only the fundamental component of the Miller drive waveform affects the primary resonant frequency as the harmonics are largely rejected. Also, the current waveform injected in the reactance summing node is essentially sinusoidal just as it is in the linear Miller reactance generator shown in FIG. 3.

As also shown in FIG. 3, the resonant transfer transformer 304 further includes a secondary inductor $L_s$ and a resonating capacitor $C_r$. Rectifier-Filter circuit 320 rectifies and filters the received sinusoidal signal before applying it to load 322.

In additional exemplary embodiments, alternative amplifier configurations may be incorporated into the reactance generator depicted in FIG. 3. The alternative embodiments may be characterized according to the amplifier type and power switching topology selected. According to Table 1, the alternative amplifier embodiments include the voltage amplifier, the trans-conductance amplifier, the current amplifier and the trans-resistance amplifier. FIGS. 4A-4D depicts four such alternative amplifier configurations while Table 1 lists the gain definition for each.

TABLE 1

Reactance generator Amplifier Configurations

| Type | Gain Definition |
|---|---|
| Voltage Amplifier | $G = V_{out}/V_{in}$ |
| Current Amplifier | $G = I_{out}/I_{in}$ |
| Trans-resistance Amplifier | $G = V_{out}/I_{in}$ |
| Trans-conductance Amplifier | $G = I_{out}/V_{in}$ |

Figure 4A:
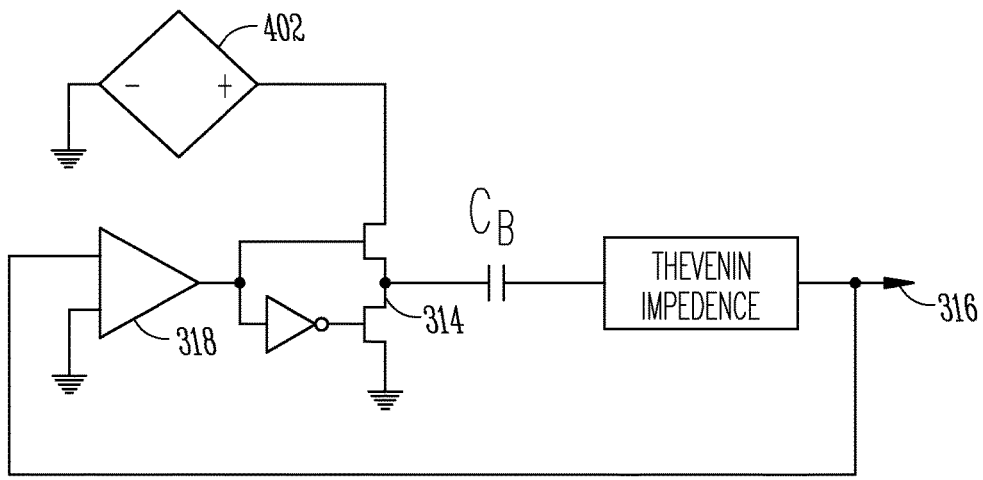
FIGS. 4A-4D depict alternative reactance generator configurations for each of the four canonical amplifier types, according to various embodiments of the invention.

In the exemplary embodiment depicted in FIG. 4A, a composite voltage amplifier is implemented by sampling the reactance summing node voltage waveform with a voltage comparator 318 and using the resulting square-wave to control the transistor switches of the half-bridge with the half-bridge powered by a magnitude controlled voltage source. The voltage comparator 318 generates a square wave having the same frequency and phase as the sinusoidal signal at node 316 that drives a power switch powered by an adjustable voltage source 402. The voltage of the adjustable voltage source 402 is set to be proportional to the amplitude of the voltage sine wave present at the reactance summing node 316. Further, in the exemplary embodiment depicted in FIG. 4D, the reactance-summing node voltage waveform is sampled with the voltage comparator 318 as before but using the resulting square-wave to control a half-bridge powered by an adjustable current source 404 effectively produces a composite trans-conductance amplifier implementation. Those skilled in the art will appreciate that a trans-conductance amplifier samples the voltage waveform present at the reactance summing node 316 and generates a square wave of the same frequency and phase that drives a power switch powered by an adjustable current source 404. The magnitude of the adjustable current source is set to be proportional to the amplitude of the current sine wave flowing into the reactance summing node 316.

Figure 4B:
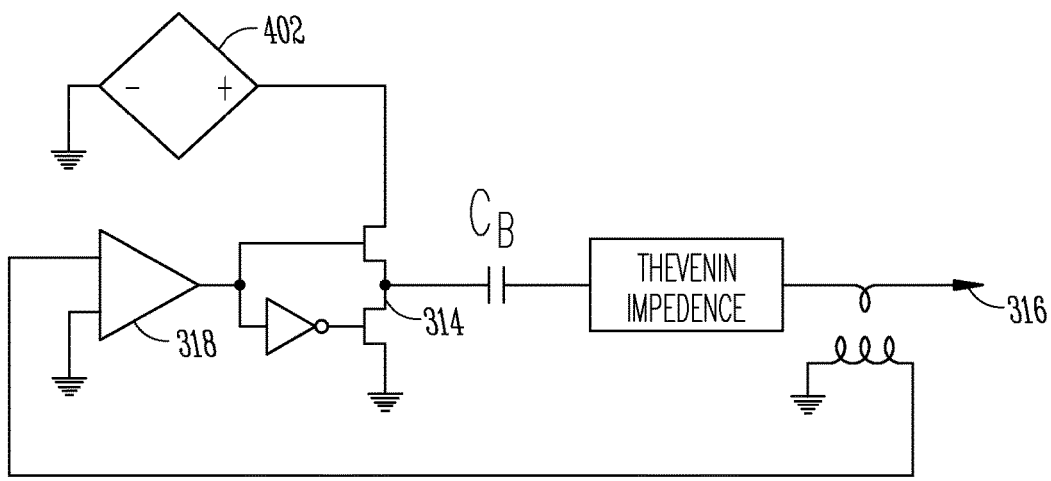
Figure 4C:
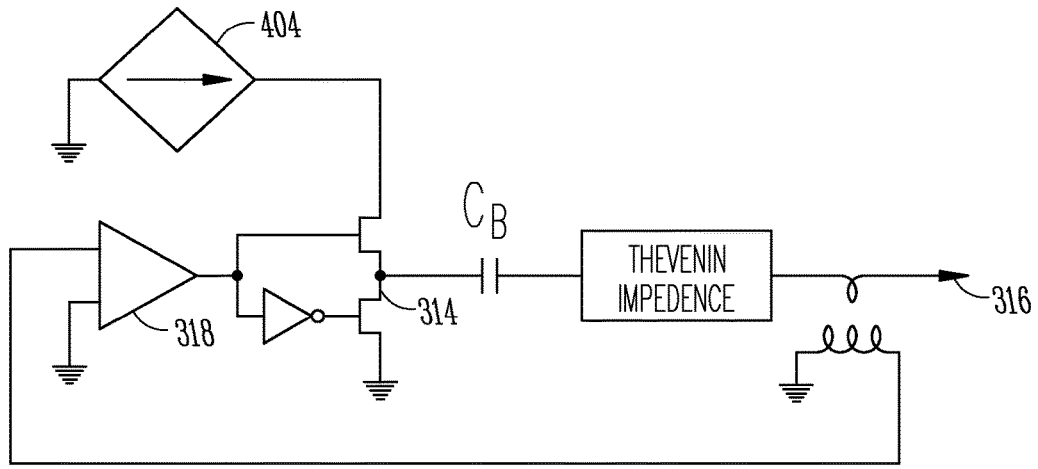
Figure 4D:
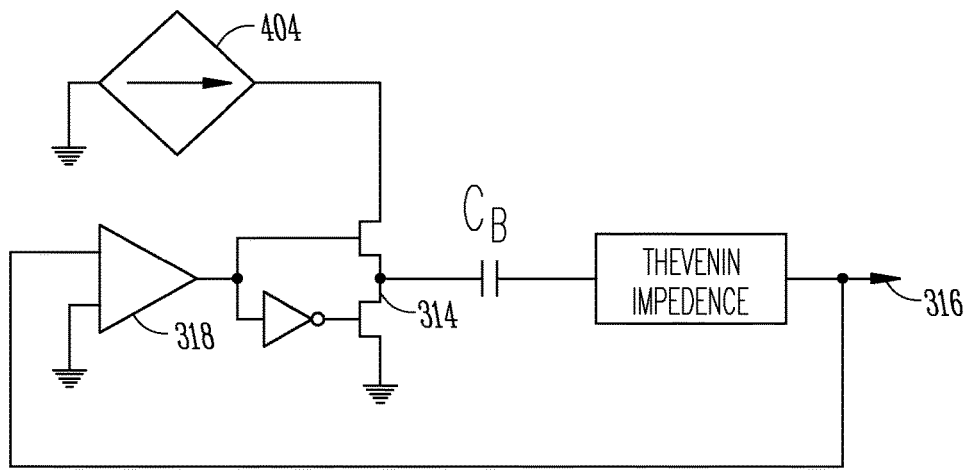

Further, in the exemplary embodiments depicted in FIGS. 4B and 4C, sampling the sinusoidal current present in the resonant circuit to be adjusted and using that square wave representation to drive a voltage source powered and current source powered Half-bridge respectively produces composite Trans-resistance and composite Current amplifier implementations. A current amplifier (FIG. 4C) samples the current waveform flowing into the reactance summing node 316, generates a square wave of the same frequency and phase that drives a power switch powered by an adjustable current source 404. The magnitude of the adjustable current source 404 is set to be proportional to the amplitude of the current sine wave flowing into the reactance summing node 316. On the other hand, a composite trans-resistance amplifier (FIG. 4B) samples the current waveform flowing into the reactance summing node 316, generates a square wave of the same frequency and phase that drives a power switch powered by an adjustable voltage source 402. The voltage of the adjustable voltage source 402 is set to be proportional to the current sine wave flowing into the reactance summing node 316. Amplifiers implemented with current source powered power switches are generally favored because of their tolerance to switching device simultaneous conduction commonly known as blow through and other faults that cause momentary, short circuit type faults. Furthermore, use of an inductor feedback reactance is favorable in embodiments using constant voltage powered switches, while a capacitive Miller generator feedback reactance is favorable in embodiments using constant current power switches. However, in practice, the most desirable amplifier configuration may depend upon the nature of the resonant load circuit, whether series or parallel resonance, the Miller Impedance type, whether inductive or capacitive and/or on other design factors.

In further exemplary embodiments, the half-bridge controllable power sources, a controllable voltage source, or a controllable current source as described above and represented in FIGS. 3 and 4A-4B can be replaced by voltage or current sources of fixed magnitude. Effective amplifier gain G and therefore the reactance proportionality factor $1/(1-G)$ may then implemented by pulse width modulation of the half-bridge. In yet another exemplary embodiment, further reactance generator control techniques make use of the phase portion of the amplifier vector gain definition G. For reactance generator drive signals in phase of or 180 degrees out of phase the denominator of Equation 1 is real. If Z in Equation 1 is implemented as an ideal reactance, specifically an inductor or capacitor then $Z_{eff}$ may also be a pure reactance and the Miller Reactance generator may provide only imaginary power, VARs to the reactance summing node.

In an exemplary embodiment, implementing Z in Equation 1 as an ideal reactance but shifting the phase of the drive signal creates an imaginary component in the denominator of Equation 1 thereby making $Z_{eff}$ complex as well. This means the reactance generator may be providing (or absorbing) real power (Watts) in addition to reactive power (VARs) to the reactance-summing node. An exemplary embodiment of the invention arranges the magnitude and phase of G in the denominator of Equation 1 such that $Z_{eff}$ consists of the sum of a real negative resistance and an imaginary reactance either positive or negative in sign. In this way, the Miller Reactance generator shoulders part of the burden in providing real power to the lead. Control of drive signal phase allows the power handling capability of the Miller reactance generator half-bridge to be assigned to the generation of purely reactive power (VARS), purely real power (watts), or some combination of both, as desired, allowing it to provide more reactive power or more real power as desired.

As illustrated above, very fine control of the parameters that determine the reactance generator output, namely power supply voltage or current amplitude, as well as drive signal power, duty cycle and phase—are easily accomplished using a variety of methods, the net effect is the synthesis of a high power variable reactance, or mixed variable reactance—variable negative resistance, the negative resistance sourcing real power, which when connected to the wireless power transfer inductor, permits smooth and nearly continuous adjustment of the transfer inductor resonant frequency.

In an exemplary embodiment of the invention, the use of the electronically variable Miller reactance described above does not preclude the use of switched, tapped, or otherwise variable reactive elements. Indeed, switched reactive elements can be incorporated into a Miller variable reactance to provide coarse step reactance change with the Miller variable reactance relied upon to continuous fine adjustment.

In yet another exemplary embodiment of the invention, the square wave signal driving the Miller Reactance generator is derived from a sample of the sinusoidal voltage or current present at the reactance-summing node 316. Alternatively, this signal can be derived from the square wave that drives the main power half-bridge either in phase or in quadrature. Furthermore, the reactance generator clock may be generated in a microcontroller or other digital or software controlled device.

FIG. 3 depicts an exemplary embodiment having an asymmetrical resonance LC circuit, asymmetrical in the sense that one side is connected of the LC circuit is grounded and the LC resonance circuit is driven by a pair of half-bridge circuits both having an un-balanced output with respect to circuit ground. As noted above, additional embodiments of the invention may employ balanced LC resonant circuits with neither side connected directly to ground driven by the balanced, symmetrical output of H-bridge drivers instead of half-bridge drivers. The power switching circuit of the invention may comprise a half-bridge configuration, a full-bridge configuration, a flyback configuration, a resonant tank with single ended or push-pull drive configuration, a single or double ended forward converter configuration, or other power switching or power conversion circuit topologies of these general configurations. Multiple power switching topologies apparent to people skilled in the art can be used in an embodiment of the power switching function of the switching amplifier portion of the Miller reactance generator described herein. These include, single or multi-switch circuits, circuits that are symmetrical or asymmetrical with respect to the power supply common terminal, single ended or push-pull configurations, half-bridge with or without capacitive voltage dividers, H-bridge configurations, fly-back and forward converters, and other power conversion topologies as are known to persons skilled in the art. Power switching topology selection is guided by the same design decision choices that guide the selection of power switching topologies for use in conventional power conversion and control applications such as dc to ac inverters, motor controllers, induction heating apparatus, and dc to dc voltage conversion devices. Other power switch configurations known to the art may be used as well.

Those skilled in the art will appreciate that the primary side and secondary side inductances of the transfer transformer must be resonated by connection of a resonating capacitor for efficient operation. The resonating capacitor can be connected in series creating a series resonant circuit, or it can be connected in parallel creating a parallel resonant circuit. Persons skilled in the art will know the series resonant connection of the transfer transformer primary side inductance is well suited to be driven by power switching circuits powered by a voltage source, while the parallel resonant connection of the transfer transformer primary side inductance is well suited to be driven by power switching circuits powered by a current source. Persons skilled in the art will also understand these broad design guidelines may be altered by the addition of an LC impedance matching network. Likewise, on the load side of the transfer transformer, series resonant connection of the transfer transformer secondary side inductance is well suited to drive loads that require a constant voltage type power source and a parallel resonant connection of the transfer transformer secondary side inductor is well suited to drive loads that require a constant current type power source. As before, persons skilled in the art will also understand these broad design guidelines may be altered by the addition of an LC impedance matching network.

Although the disclosure contained herein contemplates the use of this invention to applications requiring relatively high power (in excess of 100 watts), it should be understood that the potential list of power applications is not limited and that this invention can be applied to a wide range of power requirements.

Further, while the disclosure contained herein pertains to the provision of electrical power to vehicles, it should be understood that this is only one of many possible applications, and other embodiments including non-vehicular applications are possible. These and other embodiments of the invention are intended to be within the scope of the invention as identified by the following claims.

What is claimed:

1. An adjustable reactance generator, comprising:
   a resonant air gap transfer transformer having a primary side resonant LC circuit and a secondary side resonant LC circuit;
   a power generator that provides a first square wave through a first DC blocking capacitor and a first Thevenin inductor to a summing node of the primary side resonant LC circuit;
   a reactance generator that provides a second square wave through a second DC blocking capacitor and a second Thevenin inductor to the summing node of the primary side resonant LC circuit, wherein phase and amplitude differences between said first square wave and said second square wave produce a current into the summing node of the primary side resonant LC circuit that provides an impedance to said resonant air gap transfer transformer that is adjusted by adjusting the phase and/or the magnitude of the first and second square waves; and
   a rectifier-filter load circuit connected to said secondary side resonant LC circuit.

2. The adjustable reactance generator of claim 1, wherein the reactance generator comprises a voltage comparator that receives a voltage waveform at said summing node of the primary side resonant LC circuit and outputs a square wave on-off representation of the voltage at the summing node of the primary side resonant LC circuit, an inverter connected to an output of said voltage comparator, and a half bridge pair of power semiconductor switches respectively connected to an output of said voltage comparator and an output of said inverter.

3. The adjustable reactance generator of claim 2, wherein the power semiconductor switches comprise field effect transistors, bipolar transistors, insulated gate bipolar transistors, vacuum tubes, and/or photo-conductive switches.

4. The adjustable reactance generator of claim 2, wherein the magnitude of the second square wave is set by a controllable power supply that provides power to said second half bridge pair of power semiconductor switches.

5. The adjustable reactance generator of claim 4, wherein the controllable power supply comprises a controlled voltage source having an output voltage that is proportional to the amplitude of the voltage waveform at said summing node of the primary side resonant LC circuit.

6. The adjustable reactance generator of claim 5, wherein the proportionality of the output voltage of the power supply to the amplitude of the voltage waveform at said summing node of the primary side resonant LC circuit is $1/(1-G)$, where G is gain of the reactance generator.

7. The adjustable reactance generator of claim 4, wherein the controllable power supply comprises a controlled current source having an output current that is proportional to the amplitude of the voltage waveform at said summing node of the primary side resonant LC circuit.

8. The adjustable reactance generator of claim 7, wherein the proportionality of the output current of the power supply to the amplitude of the voltage waveform at said summing node of the primary side resonant LC circuit is $1/(1-G)$, where G is gain of the reactance generator.

9. The adjustable reactance generator of claim 4, wherein the controllable power supply comprises a controlled voltage source having an output voltage that is proportional to the amplitude of the current waveform at said summing node of the primary side resonant LC circuit.

10. The adjustable reactance generator of claim 9, wherein the proportionality of the output voltage of the power supply to the amplitude of the current waveform at said summing node of the primary side resonant LC circuit is $1/(1-G)$, where G is gain of the reactance generator.

11. The adjustable reactance generator of claim 4, wherein the controllable power supply comprises a controlled current source having an output current that is proportional to the amplitude of the current waveform at said summing node of the primary side resonant LC circuit.

12. The adjustable reactance generator of claim 11, wherein the proportionality of the output current of the power supply to the amplitude of the current waveform at said summing node of the primary side resonant LC circuit is $1/(1-G)$, where G is gain of the reactance generator.

13. The adjustable reactance generator of claim 2, wherein the magnitude of the second square wave is set by a power supply that provides fixed output power to said half bridge pair of power semiconductor switches and a pulse width modulator that modulates the output of the half bridge pair of power semiconductor switches to adjust gain of the reactance generator.

* * * * *